Aug. 6, 1940.　　　　　S. B. GRISCOM　　　　　2,210,714
MOTOR STARTING SYSTEM
Filed Sept. 14, 1938　　　3 Sheets-Sheet 1

WITNESSES:
C. J. Weller.
J. Thomas Danko

INVENTOR
Samuel B. Griscom.
BY
Paul E. Friedemann
ATTORNEY

Aug. 6, 1940.  S. B. GRISCOM  2,210,714
MOTOR STARTING SYSTEM
Filed Sept. 14, 1938  3 Sheets-Sheet 3

WITNESSES:

INVENTOR
Samuel B. Griscom.
BY
ATTORNEY

Patented Aug. 6, 1940

2,210,714

UNITED STATES PATENT OFFICE 2,210,714

MOTOR STARTING SYSTEM

Samuel B. Griscom, Forest Hills, Pa., assignor to Westinghouse Electric & Manufacturing Company, East Pittsburgh, Pa., a corporation of Pennsylvania Application September 14, 1938, Serial No. 229,857

9 Claims. (Cl. 172—289)

My invention relates to motor starting systems, and more particularly to certain improvements in starting methods and systems for alternating current motors.

In the method of starting alternating current motors of either the synchronous or the induction type, it is customary to start such motors by applying a reduced voltage until the motor has accelerated to a predetermined speed and then applying full voltage thereto. For obvious reasons this method of starting is undesirable for the windings of the motor are temporarily disconnected from the power source in making the transfer from the starting to the running position, and consequently an undesirable line surge or voltage flicker results. Those acquainted with the art are aware of numerous systems concerning methods for reducing or eliminating the current surge in a distribution system.

In making a transfer to a running position, the initial rush of current depends upon the same factors that control the current when synchronizing a machine, namely, the difference in magnitude and phase position of the machine with respect to the terminal voltages. It therefore, becomes necessary to provide means for gradually effecting the transition between starting and running voltages. Known starting methods are not effective and flexible enough for starting motors under various operating conditions, such as, with various degrees of loading.

In electric power service, there are numerous instances where line-start motors are used without any objectional voltage drop. However, there are instances where a single motor represents the largest block of the total load and if line-starting were permitted, a current of several times the normal rating of the motor would be required. Particularly is this so where air conditioning equipment is installed in private residences, motor-generator sets in hotels and large department stores are operated from the low-voltage networks in downtown areas and in small communities where a factory may have a single motor with a starting demand exceeding the entire other load of the community.

My invention, in particular, deals with cases where reduced voltage starting by auto-transformer methods is satisfactory from the standpoint of the initial bump but objectionable during the transfer from the starting to running interval.

According to my invention, the motor is started from a low voltage source through an auto transformer comprising a multi-leg core with polyphase windings on all but one of the cores. An independent winding is wound on the remaining core and is connected to a source of unidirectional current. Briefly, when the motor reaches substantially synchronous speed, connections are made to operate the transformer directly as a reactor. During such transition period, the reactor is saturated by the independent winding reducing the impedance of the winding to a desired value, consequently raising the terminal voltage of the motor to a value approximating that of the line voltage, whereupon the motor may be connected directly to a full voltage. A system of control is provided for automatically bringing the motor to its normal running operation upon actuating a single push button.

It is, therefore, an object of my invention to provide a motor starting system in which the motor is started on a reduced voltage and is gradually transferred to a normal running voltage.

Another object of my invention is to control the starting of an alternating current motor by means of an auto-transformer adapted to operate as a reactor.

Still further, it is an object of my invention to provide a motor starting system by varying the impedance between the motor and its source of supply.

Another object of my invention is to provide a motor starting system of the above character that shall be simple, reliable and automatic in operation.

Other objects and advantages of my invention will become apparent from the following detailed description taken in conjunction with the accompanying drawings, in which.

Figure 1:
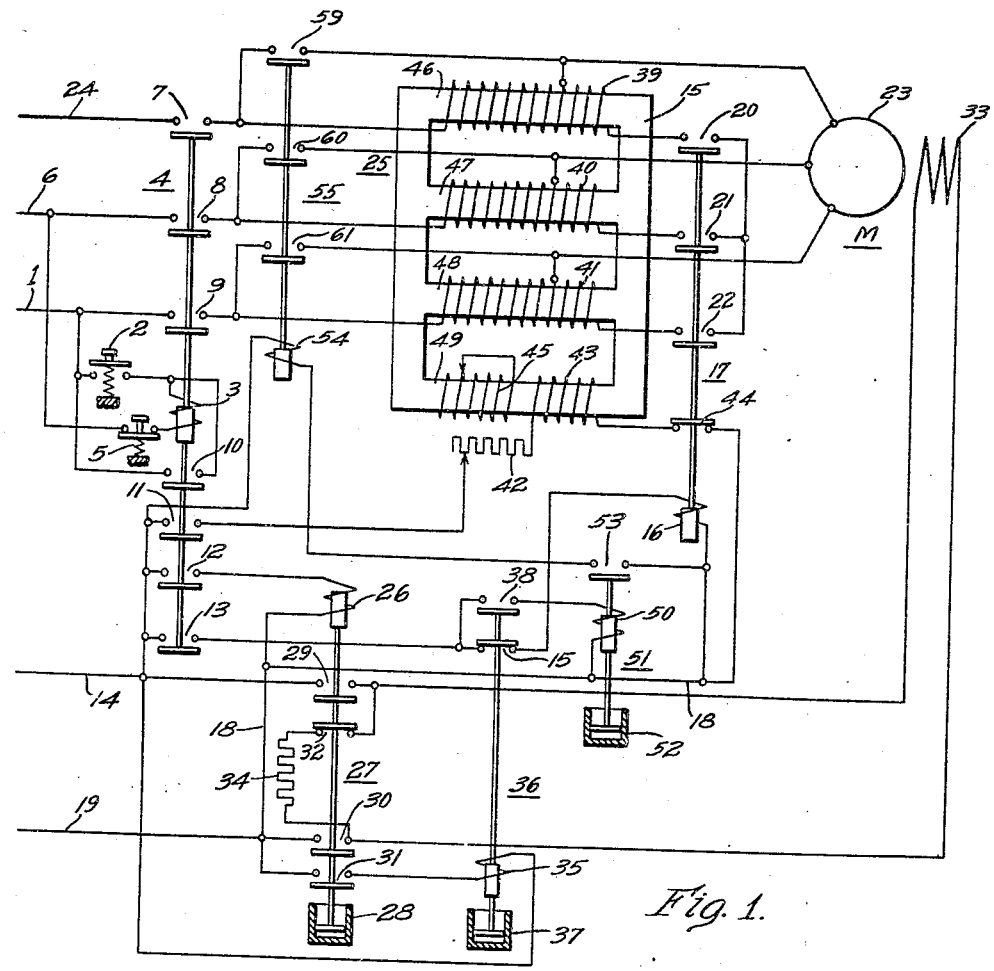
Figure 1 is a diagrammatic illustration of a starting system showing one embodiment of my invention.

Referring more particularly to Fig. 1 of the drawings, I show a motor M which may be either of the synchronous or wound rotor type, being supplied with electrical energy from an alternating current source indicated by buses 1, 6 and 24 through a main circuit breaker 4. An auto-transformer 25 or any suitable starting compensator and a starting switch 17 are provided for starting the motor M on a reduced voltage and a running switch 55 is used to connect the motor M directly to the power source after the motor M has reached substantially synchronous speed.

The auto-transformer 25 is of the multi-leg closed core type and for purposes of explaining my invention I show the auto-transformer 25 as a four-legged core type having the legs 46, 47, 48 and 49. Polyphase windings 39, 40 and 41 are mounted on three of the core legs 46, 47 and 48, while an independent winding 43 is wound on the remaining core leg 49. A source of unidirectional current, as evidenced by buses 14 and 19, is adapted to supply energy to the independent winding 43.

Figures 3, 5:
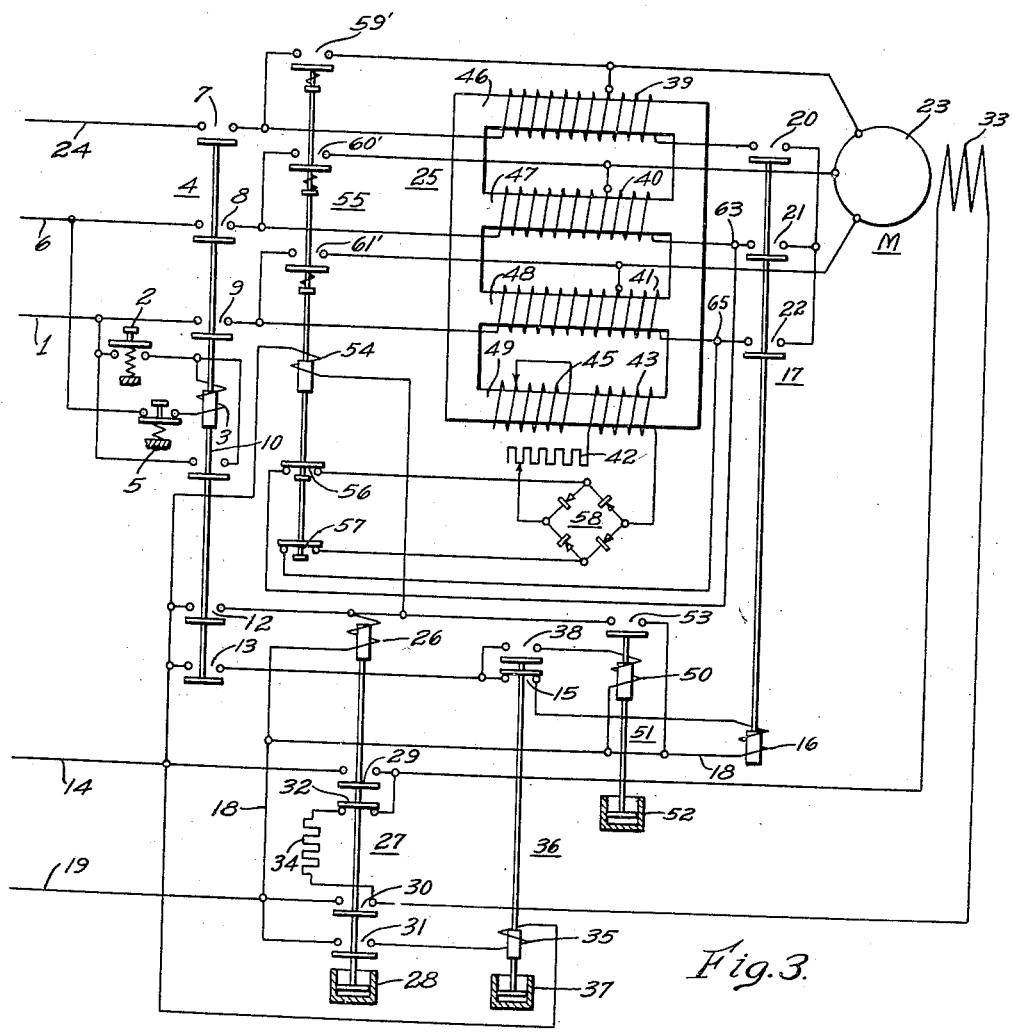
Fig. 3 is a diagrammatic showing of a still further modification of my invention.
Fig. 5 is a curve showing the same relationships for an auto-transformer started motor according to my invention.

A source of direct current such as may be derived from a Rectox may be used as illustrated in Fig. 3. The purpose of the independent winding 43 is to saturate the legs of the auto-transformer 25 and the time required to make a complete change from a non-saturated to a saturated state may be controlled at will by inserting a suitable resistor 42 between the unidirectional current source and the independent winding 43 or by the use of a closed circuit winding 45, or both. While conditions may require a rapid building up of flux in the core 49, circumstances may develop requiring a slower building up process. This may be effectively accomplished by mounting a short-circuited winding 45 on the same leg 49 of the core as the independent winding 43 or may be divided with an equal number of turns on each of the legs 46, 47, 48 and 49. Generally, the time constant for the building up process by the independent winding 43 should be made to approximate that of the field 33 of the motor M being started. It is to be understood, however, that the short-circuited winding 45 or shortcircuited windings on each leg, need not be used if the requisite control can be obtained with rheostat 42 alone. A better understanding of the novel features of my invention and its relation to an alternating current motor M can be had from a study of the starting sequence.

Assume the attendant wishes to start the motor M, he closes the switch 2 which I have illustrated as a push-button switch, although it is to be understood that switch 2 may be closed by any automatic means if found desirable, or by a suitable supervisory control system.

The closing of switch 2 completes a circuit from one of the alternating current buses 1, through the switch 2, the operating coil 3 of the circuit breaker 4, a normally closed stop switch 5 and back to another alternating current bus 6.

The above outlined circuit supplies energizing current to the operating coil 3 of the circuit breaker 4 and the circuit breaker 4 closes its contact members 7, 8, 9, 10, 11, 12 and 13. Closure of contact members 10 establishes a holding circuit for coil 3 and switch 2 may be opened.

The closing of contact members 13 establishes a closed circuit from bus 14 of the direct current source, through contact members 13, the normally closed contact members 15, the operating coil 16 of starting switch 17 and conductor 18, back to the other direct current bus 19. The circuit thus established results in the closing of contact members 20, 21, 22 and the opening of contact members 44 of the starting switch 17.

Since contact members 7, 8 and 9 of the circuit breaker 4 and contact members 20, 21 and 22 of the starting switch 17 are all closed, the armature winding 23 of the motor M is energized with alternating current from buses 1, 6 and 24 through the auto-transformer 25 and the motor begins to accelerate, being energized at a reduced voltage. It will be understood, of course, that the portion of the auto-transformer 25 through which the motor M will be connected during the starting period will be adjusted by suitable well known means.

The closing of contact members 12 completes a circuit from the bus 14 through contact members 12, the operating coil 26 of the field contactor 27 and conductor 18 to bus 19. Upon completion of this circuit current begins to flow through the operating coil 26 and after a predetermined time, as determined by the adjustment of the time limit means 28, the contact members 29, 30 and 31 close and contact members 32 open. Opening of contact members 32 opens the field discharge circuit of the field winding 33 through discharge resistor 34.

The contact members 32 are so arranged with reference to the contact members 29 and 30 that the contact members 32 open an instant after contact members 29 and 30 close. The field winding is thus at no time during the starting on open circuit. Furthermore, the closure of contact members 29 and 30 connects the field winding 33 to the source of direct current and thereby synchronizes the motor M.

The time limit means 28 are in practice so adjusted that the motor M will be at its balancing speed operating as an induction motor before synchronization is effected.

The closing of contact members 31 closes the circuit for coil 35 of the time limit relay 36. The time limit relay 36 is provided with adjustable time limiting means 37 which means are so adjusted that no further switching operations take place until after the motor has had time to synchronize. After the requisite time interval, contact members 15 open and contact members 38 close.

Opening of the contact members 15 opens the energizing circuit for coil 16 of the starting switch 17 and in consequence contact members 20, 21 and 22 are opened and contact members 44 are closed. The motor armature is no longer energized at a low voltage through a selected portion of the windings 39, 40 and 41 of the auto-transformer 25, but the motor armature 23 is connected to the source of alternating current through given portions of these transformer windings acting as reactors.

It should be noted that the opening of contact members 20, 21 and 22 does not open the armature energizing circuit. The circuit remains closed from buses 1, 6 and 24 through a portion of the windings 39, 40 and 41 acting as reactors.

Closure of contact members 44 establishes a circuit from the direct current bus 14 through contact members 11, adjustable resistor or rheostat 42, independent winding 43, contact members 44 and conductor 18 to bus 19.

Due to the inherent inductance of the independent winding 43 there will be a time delay in the building up of the flux. This delay is desirable for a gradual voltage change may be had of the reactor impedance from a high to a low value thus increasing the voltage on the motor M gradually. Essentially then this step in the building up process is to convert the auto-transformer winding 39, 40 and 41 into a direct reactor, and saturating the latter thereby reducing the impedance of those portions of the transformer windings in series with the motor M and the source of supply. After a short delay, the terminal voltage in motor M will approach the voltage of the supply with possibly only a few degrees lag in phase relationship.

The speed with which saturation may take place may be adjusted by the adjustable short-circuited winding 45 on the core leg 49. The rate of saturation may, of course, be thus adjusted at will, but ordinarily the most desirable acceleration can be obtained by making the time constant of winding 45 approximately that of the field winding as 33 of the motor being started.

When contact members 38 are closed, a circuit is completed from the direct current bus 14, through contact members 13, contact members 38, the actuating coil 50 of the time limit relay 51, and back to the other bus 19. After a predetermined time, as determined by time limit means 52, contact members 53 close and a circuit is established from the direct current bus 14, through the operating coil 54 of the running switch 55, contact members 53 and conductor 18 back to the other direct current bus 19. The completion of the latter circuit sends energizing current to the coil 54 and, in consequence, the motor M is connected through contact members 59, 60 and 61 directly to the full voltage of the source of alternating current.

Figure 4:
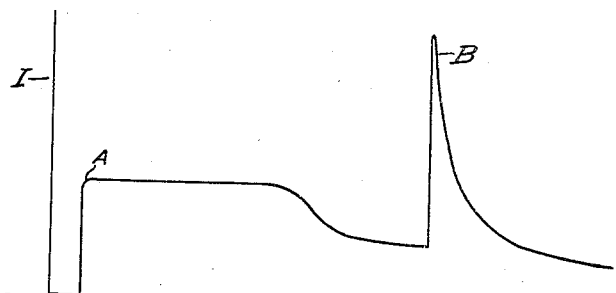
Fig. 4 is a curve showing the relationship between line current demand and time for an ordinary auto transformer started motor.

As exemplary of the manner in which my invention is to be applied, I have shown in Figures 4 and 5, a graphical outline of the characteristics of a motor as started by the ordinary auto-transformer method and the method according to my invention. Both figures illustrate the relationship that exists between current demand and time. By a comparison of the two figures it will be seen that while the peaks designated by letters A and C are satisfactory from the standpoint of the initial "bump," yet the "bump" in transferring from starting to running connections is objectionable. From an inspection of Figure 4, it can be readily seen that the "bump" at point B may be considerably higher than peak at A.

According to my invention the peak designated by letter B is substituted by two smaller peaks as shown by letter D and E in Fig. 5. More specifically the peak at D occurs upon opening the starting switch 17 while the peak at E is formed when the transfer to the running switch 55 is made. The net effect is to reduce an abrupt voltage drop which may cause a noticeable flicker to the eye and effect a smooth transfer between the starting and running connections.

Figure 2:
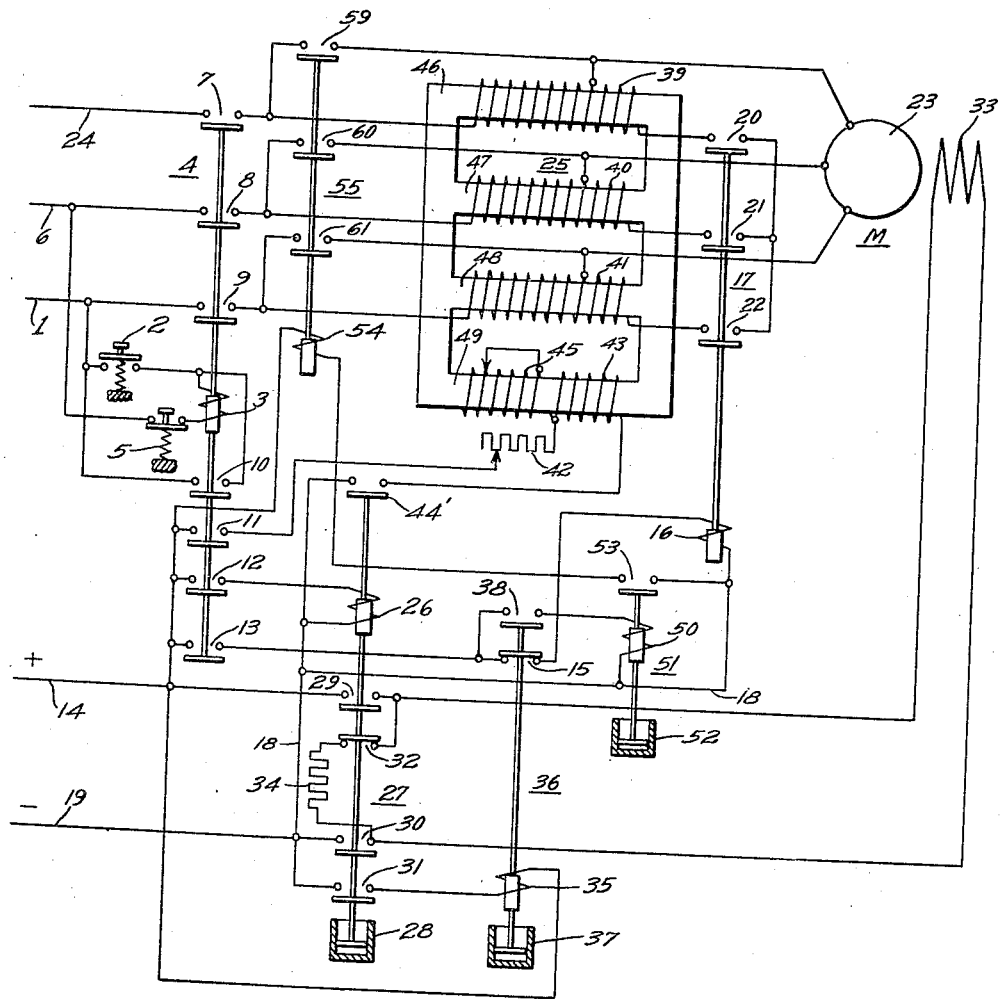
Fig. 2 is a diagrammatic showing of another embodiment of my invention.

In the modification shown in Fig. 2 I show a variation in the starting process that can be made in the transfer operation. In this modification the field contactor 27 applies direct current to the field winding 33 of motor M simultaneously through contact member 44', applying direct current to the saturating winding 43 before the transition breaker 17 is opened.

Insofar as the line voltage is concerned, there is little tendency for the current to change, because by energizing the motor field 33 leading current will be drawn while, on the other hand, saturating the auto-transformer core while the breaker 17 is closed will draw lagging wattless current. The two currents may be made to approximate one another thereby cancelling their effect on the line current. Due to the fact that the auto-transformer 25 is partly saturated when the breaker 17 is opened, the phase displacement will be practically negligible. The operation heretofore described in connection with Fig. 1 may likewise be read in connection with Fig. 2, since it is, except for the time of energization of the winding 43, practically the same.

Referring to Fig. 3 I show another modification which may be utilized in applications where it would be more favorable to use a Rectox 58 to obtain direct current for the winding 43. In such event the Rectox 58 may be energized by making proper connection to the neutral points 63 and 65 of the auto-transformer 25. The sequence of starting is to close the main circuit breaker 4 and the starting switch 17 thereby applying a reduced voltage to the motor M which will accelerate to near synchronous speed.

In the starting sequence heretofore described when the switch 17 is opened and the auto-transformer 25 is converted into a straight reactor, a major portion of the line voltage will instantly appear across the Rectox 58 from which a unidirectional current can be supplied to the independent winding 43. When switch 17 is opened and the sequence of operations heretofore described followed resulting in sending an energizing current to the coil 54, in consequence closing contact members 59', 60' and 61' and opening the normally closed contact members 56 and 57 thereby disconnecting the Rectox 58 from the supply line. The operation of the circuit shown in Fig. 3 is otherwise essentially the same as shown in Fig. 1 and hence repetition is unnecessary.

The above-described method for starting an alternating current motor results in substantially eliminating the peak in the starting current as may be readily understood from a study of the curve in Fig. 4 which illustrates current demand using the ordinary transition method, while the curve in Fig. 5 shows current demand with my improved method.

While, for purposes of illustration, I have shown and described certain specific embodiments of my invention, it will be apparent to those skilled in the art that changes and modifications can be made therein without departing from the true spirit of my invention or the scope of the appended claims.

I claim as my invention:

1. A starting system for an alternating current motor comprising, in combination, an alternating current motor, an auto transformer, a source of electric power, low voltage starting connection, transition connections, high voltage running connections, of means for connecting said motor to said auto transformer through said starting connections, means for reconnecting said motor from said starting connections to said transition connections upon reaching substantially synchronous speed, means for transferring said motor to said running connections, said last mentioned means including said auto-transformer, and means for connecting said auto transformer first as a transformer and subsequently as a reactor between said power source and said motor, and means for varying the impedance of said reactor until substantially full voltage is applied to said motor.

2. A starting system for an alternating current motor comprising, in combination, a source of alternating current power, an alternating current motor, a saturable auto-transformer, a switch member for connecting said motor to said supply source through said auto-transformer with said switch member in starting position, means for bringing said motor into synchronism, means for saturating said transformer upon transferring said motor from its starting position to an intermediate position and a switch member for connecting said motor directly to said power source a predetermined time after saturating said transformer.

3. A starting system for an alternating current motor comprising, in combination, a source of electrical power, an alternating current motor, an auto-step-down transformer, means for connecting said motor with said power supply through said auto-transformer, means for reconnecting said auto-transformer as a direct reactor in series with said motor when said motor reaches substantially normal speed, means for saturating said reactor thereby lowering the impedance of that portion of said reactor in series with said motor and said supply source consequently raising the terminal voltage of said motor and means for connecting said motor directly to said power supply a predetermined time after saturating said reactor.

4. A starting system for an alternating current motor comprising, in combination, a source of electric power, an alternating current motor, an auto-starter, switching means for connecting said motor to said power supply through said auto-starter with said switching means in starting position, said auto-starter comprising a multi-leg core with polyphase windings on some of said legs, an independent magnetizing winding on the other of said legs, means for magnetizing said independent winding simultaneously upon transferring said motor from its starting position to a transition position and switching means for connecting said motor to its running position at a time depending upon the degree of saturation.

5. A control system for starting synchronous motors comprising, in combination, a synchronous motor, an auto-transformer provided with low voltage starting connection, high voltage running connections, said transformer having a saturable core, polyphase windings on said core and an independent winding wound on a separate leg of said core and means for supplying to said independent winding a unidirectional current for saturating said core simultaneously upon transferring said motor from said low voltage starting connection to said high voltage running connection.

6. A method of starting an alternating current motor having an armature winding and a field winding which consists in connecting said armature winding to a low starting voltage through an auto-transformer, supplying a current to said field winding, connecting said auto-transformer as a direct reactor when said motor reaches substantially synchronous speed, applying a direct-current source of potential to a separate winding on said auto-transformer thereby saturating said reactor until substantially full voltage is supplied to said motor, reconnecting said reactor and connecting said motor directly to a source of high running voltage.

7. A method of starting an alternating current motor comprising the application of low voltage to said motor through an auto-step-down transformer, connecting the windings of said transformer as a direct reactor, applying a direct-current source of potential to a separate winding on said auto-transformer thereby saturating said reactor, adjusting the rate of saturation to conform to the field current of said motor, reconnecting said reactor and impressing full running voltage to said motor.

8. A method of controlling an alternating current motor having rotor and stator windings comprising the application of a low starting voltage across said stator winding through an auto-transformer, maintaining low voltage on said motor until substantially normal speed is attained, switching said auto-transformer to operate on a reactor, applying a direct-current source of potential to a separate winding on said auto-transformer thereby saturating said reactor to reduce the impedance between the power source and said motor, reconnecting said reactor when said impedance reaches a predetermined value and impressing full running voltage thereafter to said stator.

9. A method of starting a synchronous motor having an armature and a field winding which consists in impressing a low starting voltage across said armature winding through an auto-transformer until near synchronous speed is reached, simultaneously energizing said field winding, reconnecting the windings of said auto-transformer to serve as a reactor, supplying unidirectional current to an independent winding on said reactor to produce saturation, reconnecting said reactor, and connecting said motor to full running voltage.

SAMUEL B. GRISCOM.